United States Patent [19]

Hodges

[11] Patent Number: 4,641,598
[45] Date of Patent: Feb. 10, 1987

[54] BOAT-TRAILER LATCH

[76] Inventor: Donald F. Hodges, Box 486, Ontario, Oreg. 97914

[21] Appl. No.: 716,268

[22] Filed: Mar. 26, 1985

[51] Int. Cl.$^4$ .............................................. B60P 3/10
[52] U.S. Cl. ..................................................... 114/344
[58] Field of Search ...................... 114/344, 249, 250; 280/414.1, 507–510

[56] References Cited

U.S. PATENT DOCUMENTS

| | | | |
|---|---|---|---|
| 2,754,792 | 7/1956 | Baird | 114/230 |
| 3,060,885 | 10/1962 | Nolf | 114/230 |
| 3,963,263 | 6/1976 | Whitlock | 280/414.1 |
| 4,242,768 | 1/1981 | Winsett | 114/344 |
| 4,262,922 | 4/1981 | Nelson | 280/414.1 |

FOREIGN PATENT DOCUMENTS 932294  1/1956  Fed. Rep. of Germany ...... 114/230

*Primary Examiner*—Trygve M. Blix
*Assistant Examiner*—Jesûs D. Sotelo
*Attorney, Agent, or Firm*—Paul F. Horton

[57] ABSTRACT

A latch assembly for securing a boat to a trailer for loading the boat onto the trailer although the boat may be floating at varying water levels relative to the trailer. The latch assembly includes a first latch, provided with a retentive framework and spring loaded door, mounted on the bow of a boat and a second or mating latch, having a framework provided with an elongated and vertically oriented latch pin. The framework of the mating latch is hingably mounted to a trailer post located adjacent the front of the trailer so as to incline in conformity with the bow of a boat. The spring loaded door of latch strikes the elongated latch pin at a vertical position dependent upon the water level, boat height, and trailer level and opens and then closes to captivate the latch pin. As the trailer is removed from the water, the latch slides down the latch pin until the boat rests upon the trailer bed.

10 Claims, 5 Drawing Figures

4,641,598

BOAT-TRAILER LATCH

BACKGROUND OF THE INVENTION

1. Field of the Invention

This invention relates, in general, to boat latches for automatically securing a boat to a trailer, and, more particularly, boat latches which are operable at varying levels between a floating boat and a trailer.

2. Description of the Prior Art

It is highly desirable to be able to latch a boat to a trailer without the aid of two persons and without the necessity of getting into the water. A number of automatic latches, as typified by U.S. Pat. No. 3,963,263 issued to R. Whitlock; U.S. Pat. No. 3,938,829 issued to J. D. Anderson; U.S. Pat. No. 3,989,267 issued to N. D. Robinson; and U.S. Pat. No. 4,463,965 issued to F. A. Lawson, have been devised to meet this need. A common problem to all still remains however, in that in the placement of a boat trailer in the water, the level of the water and therefore the level of the boat to be loaded is not compatible, i.e., in proper alignment with the trailer to allow the eye-ring on the bow of the boat to properly engage the latch device on the trailer. This problem is only exacerbated by the wave action of the water and the pitch of the trailer relative to the water. Damage to the boat and/or the trailer, as well as injury to the bow operator, can readily occur if the boat is powered onto the boat trailer for automatic latching.

SUMMARY OF THE INVENTION

The present invention solves this problem by providing a latch mechanism on the bow of the boat and an elongated vertically extending latch pin, held in a normal vertical position by a spring biased framework which is pivotally mounted to a boat trailer so as to incline rearwardly to conform to the bow of a boat for proper alignment between the latch pin and the latch mechanism on the bow. The latch mechanism engages and captivates the latch pin at any position along the length of the latch pin, depending upon the level of the floating boat relative to the position of the boat trailer. Once latched, as the trailer is pulled from the water, the boat settles onto the bed of the trailer with the latch mechanism on the bow of the boat sliding down the latch pin. The latch mechanism on the bow of the boat is preferably located on the same horizontal level as the pivot point of the latch pin framework on the trailer when the boat is resting upon the trailer bed, for structural integrity. For unloading, the latch mechanism may be manually uncoupled from the latch pin. A more detailed description of the invention may be found in the appended claims.

DETAILED DESCRIPTION OF THE INVENTION

Figure 1:
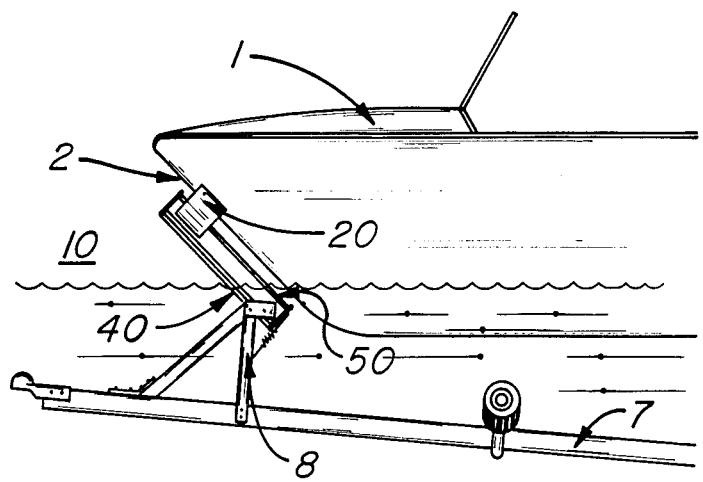
FIG. 1 is a side elevation of the boat latch of the present invention showing the boat in a latched position while floating above the trailer, both boat and trailer shown in part.

Referring now to the drawings, and, more particularly to FIG. 1, an embodiment to be preferred of a boat-trailer latch 10 made according to the present invention is disclosed. Latch 10 includes, generally, two components -- a boat component, first latch means 20 and a trailer component, second latch means 40.

Figure 3:
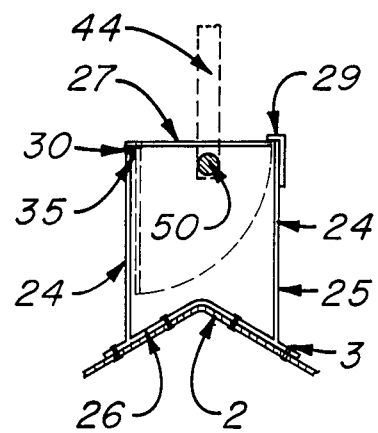
FIG. 3 is a plan view of one embodiment of the boat component of the latch.
Figure 4:
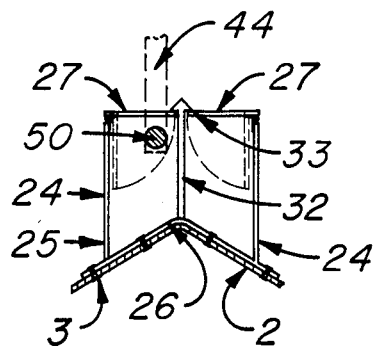
FIG. 4 is a plan view of a second embodiment of the boat component of the latch.

First latch means 20, shown to advantage in FIGS. 3 and 4, includes a substantially C-shaped framework, designated generally by the numeral 25 and one or more latch doors, designated generally numeral 27. The framework may be constructed of any suitable material, stainless steel being preferred because of its strength and non-corrosive characteristics. Framework 25 includes a back plate 26 adapted for mounting on the bow 2 of boat 1 by mounting means 3, shown in the form of nut-bolt assemblies, and a pair of laterally spaced side members 24. In the embodiment shown in FIG. 3, the framework is provided with a single latch door 27 mounted to one of the side members by a hinge 30. The hinge is affixed to the side member and door in a vertical position so that the door rotates backwardly about a vertical axis. The door 27 is biased to a normally closed position where it engages a stop 29 mounted on the end of opposing side member 24. Coil spring 35, or other conventional springs, may be used to bias the door latch into a closed position. The door latch 27 is forced into an open, latch-pin receiving position when the force exerted between latch pin 50 and the door latch 27 overcome the bias of the spring.

In the embodiment shown in FIG. 4, the framework 25 is provided with a pair of doors 27. The doors are biased and mounted the same way as shown in FIG. 3, but the framework includes a central stop 32 having a pair of shoulders 33 engageable with a respective door latch 27. The inclusion of two door latches extends the width of first latch 20 for receiving the pin. The door or doors in the normally closed position form a retentive enclosure with the framework to capture and retain latch pin 50. While doors 27 are shown as a preferred embodiment, the door latches may be in the form of a spring loaded slide bar or slide bars in which the bars are biased to a normally closed position and therefore the term "doors" as used herein and in the appended claims is understood to cover such an obvious variation.

Figure 2:
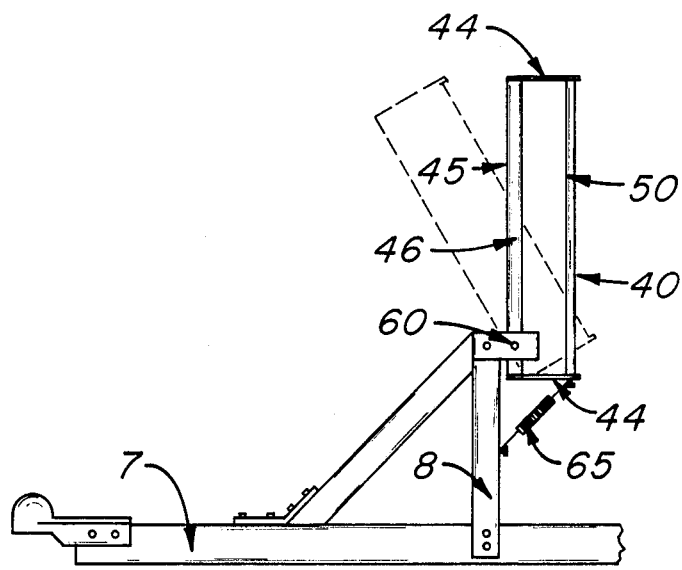
FIG. 2 is a side cross sectional view of the trailer component of the latch.

Second latch means 40, shown to advantage in FIG. 2, is mounted on the forward end of a trailer 7, preferably by attachment to an upwardly extending post 8, the post being conventional on many trailers. Second latch means 40 includes a framework designated generally by the numeral 45, preferably of C-shaped construction including a back support 46 and a pair of end members 44. An elongated latch pin 50, circular in cross section and preferably eighteen or more inches in length, is affixed between the end members, defining an enclosure. Framework 45 is mounted to the framework and to post 8 in a horizontal position so that the framework with affixed latch pin are vertically oriented and rotate backwardly about a horizontal axis. Framework 45 is biased to a substantially vertical position by means of a tension spring 65, or other suitable spring. Framework and latch pin are preferably constructed of stainless steel for strength and non-corrosive characteristics.

Framework 45 may also be provided with a pair of boat guides, not shown, operable to direct the bow of the boat towards the latch pin.

Figure 5:
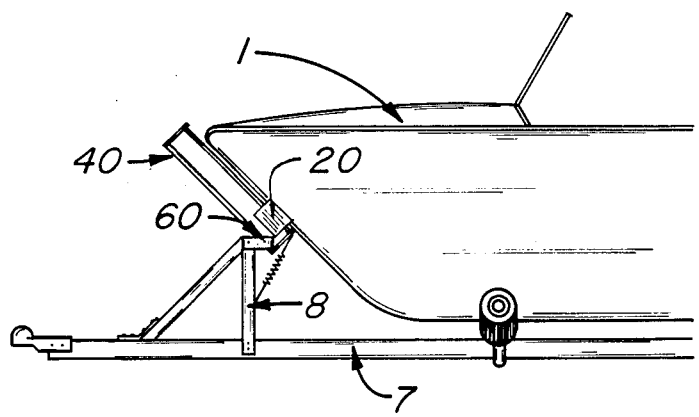
FIG. 5 is a side elevation of the boat latch of the present invention showing the boat in a resting position on the trailer, both boat and trailer shown in part.

In utilizing the boat latch 10 of the present invention and assuming the desire to load a boat 1 upon a trailer 7, the trailer is first back into the water by the use of a suitable vehicle, not shown. The present invention accomodates a boat which may be floating on varying water levels relative to the positioning of the trailer. Such circumstances may occur because of the steepness of the ramp supporting the trailer, because of wave action, because of boat load, as well as other factors. Assuming the boat and trailer levels are as depicted in FIG. 1, the boat is powered forward until the door latch or latches 27 of first latch means 20, mounted on the bow 2 of boat 1, makes contact with latch pin 50 of second latch means 40, mounted on post 8 of trailer 7. The framework 45 of second latch means 40 pivots backwardly for proper alignment between latch pin 50 and door latch 27. As the force of the biasing spring 30 of the door latch is overcome by the force exerted between the latch pin and door, the door swings backwardly allowing the latch pin to enter the enclosure defined by the framework 25 of first latch means 20. Once penetration of the latch pin is sufficient and the door is no longer engaging the latch pin, the door 27 springs shut, retaining the latch pin as shown in FIGS. 3 and 4, thus securing the boat to the trailer. As the trailer is pulled from the water, the boat settles onto the bed of the trailer as latch 20 slides down latch pin 50 reaching the position as shown in FIG. 5. In this position, it is to be noted, first latch means 20 is substantially in horizontal alignment with hinge 60 of second latch means 40. It is an important feature of the present invention, for structural integrity, that the hinge 60 and latch 20 be in substantial alignment to prevent undue structural stress on the latch pin, frameworks, and the hinges. If desired, the boat may be fastened to the trailer by supplemental means for travel. For unloading the boat from the trailer, door 27 of first latch means 20 may be manually opened to release the latch pin.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Boat latch apparatus for securing a boat to a trailer at varying water levels, said apparatus comprising:

First latch means comprising a framework, at least one latch door pivotally engaging said framework to define a retentive enclosure when said door is in a closed position, and means for mounting said first latch means to the bow of a boat; and second latch means comprising a framework and an elongated latch pin affixed to the framework, said framework pivotally engaging a trailer adjacent the forwardmost end of the trailer, and said elongated latch pin operable to strike said door of said first latch means at a position along the length of said latch pin to open said door, and to be retained by said door and said framework of said first latch means.

2. The apparatus as described in claim 1 wherein said framework of said first latch means is substantially C-shaped in construction.

3. The apparatus as described in claim 1 wherein each of said doors of said first latch means includes a spring operable to keep the respective door in a normally closed position.

4. The apparatus as described in claim 1 wherein said framework of said second latch means pivotally engages a trailer post.

5. The apparatus as described in claim 1 wherein said framework of said second latch means is substantially C-shaped in construction.

6. The apparatus as described in claim 1 wherein each of said latch doors of said first latch means hingeably engages said first latch means framework about a vertical axis and wherein the framework of said second latch means hingeably engages a trailer post about a horizontal axis.

7. The apparatus as described in claim 1 wherein each of said latch doors of said first latch means and a pivot between the framework of said second latch means and the trailer are as of substantially the same horizontal level when the boat is resting upon the trailer.

8. The apparatus as described in claim 1 wherein said framework of said second latch means is spring biased to hold said framework and said latch pin in a substantially normal vertical position.

9. Boat latch apparatus for securing a boat to a trailer, said apparatus comprising:

First latch means affixable to the bow of a boat and comprising a framework having a back member and two laterally spaced side members; and at least one spring loaded latch door, each latch door hingably engaging one said side members about a vertical axis to define a retentive enclosure when in the normally closed position; and second latch means comprising a substantially C-shaped framework, having a back support and a pair of end members, said framework vertically oriented and hinged to a trailer post about a horizontal axis; said framework being spring biased to a normal vertical position; and an elongated latch pin extending between said end members to define a retentive enclosure with said framework; said latch pin operable to engage one of said doors of said first latch means for opening the door and said latch pin receivable within said first latch means to secure the boat to the trailer.

10. The apparatus as described in claim 9 wherein each of said latch doors of said first latch means are substantially horizontally level with the hinge of said second latch means.

* * * * *